(12) United States Patent
Levi et al.

(10) Patent No.: US 7,761,568 B1
(45) Date of Patent: Jul. 20, 2010

(54) DATA TRANSMISSION VERIFICATION AND IDENTIFICATION SYSTEM AND METHOD

(75) Inventors: Ronald M. Levi, Calabasas, CA (US); Shai Shprung, Calabasas, CA (US)

(73) Assignee: Xweb, Inc., Carson City, NV (US)

( * ) Notice: Subject to any disclaimer, the term of this patent is extended or adjusted under 35 U.S.C. 154(b) by 1759 days.

(21) Appl. No.: 10/771,906

(22) Filed: Feb. 3, 2004

(51) Int. Cl.
*G06F 15/173* (2006.01)
(52) U.S. Cl. .................. 709/225; 709/245; 709/238; 709/217; 709/218; 709/219; 709/223; 709/224; 726/2; 726/26
(58) Field of Classification Search ......... 709/223–225, 709/245, 217–219, 238; 726/2, 26
See application file for complete search history.

(56) References Cited

U.S. PATENT DOCUMENTS

| | | | |
|---|---|---|---|
| 6,578,066 B1 * | 6/2003 | Logan et al. ............... | 718/105 |
| 6,757,740 B1 * | 6/2004 | Parekh et al. ............... | 709/245 |
| 7,184,971 B1 * | 2/2007 | Ferber ......................... | 705/14 |
| 2001/0042002 A1 * | 11/2001 | Koopersmith ............... | 705/10 |
| 2005/0027821 A1 * | 2/2005 | Alexander et al. .......... | 709/218 |

* cited by examiner

*Primary Examiner*—Nathan Flynn
*Assistant Examiner*—Mohammad A Siddiqi
(74) *Attorney, Agent, or Firm*—Foley & Lardner LLP (57) ABSTRACT

Embodiments of the data transmission management system are directed to a system which confirms transmission requests from users and identifies the user's geographical region. Embodiments of the data transmission management system comprise a storage member, a confirmation system and a re-direct system, wherein the confirmation system confirms a user's request for data and identifies the user's geographical region, and wherein the re-direct system selects and transmits suitable data for that region. The data transmission management system further operates in conjunction with an animated module utilized to ascertain payment data, wherein the animated module visually depicts the desired information from the user.

25 Claims, 10 Drawing Sheets

Widget Info

Magazine Mailer

Join For Free

Name (optional) [ ____ ]
E-mail Address [ ____ ] — 40
Password [ ____ ]
6465 Enter Code [ ____ ]

[Enter Now] — 44

From: Widget Info Mailer Mag
Sent: October 31, 2000, 2:17 pm
To: user@wantdata.com
Subject: Thank You For Signing Up Hello,
Thank you for subscribing!

Click here to confirm

[ CONFIRM ] — 92

Figure 7

Hello,
Password activated
Click to Log-In

Username: ~~post~~ user@wardata.com

Password: testing

Click Above to Enter Site

| New Offer For Free Services |

DATA TRANSMISSION VERIFICATION AND IDENTIFICATION SYSTEM AND METHOD

FIELD OF THE INVENTION

This invention is directed to a data transmission management system and method for confirming transmission requests and identifying user information prior to the transmission of data. In particular, a data transmission management system that allows confirmation of a user's request for the transmission of data and identification of the user's geographical region to allow the system to direct the user to data suitable for the identified region.

BACKGROUND OF THE INVENTION

Global computer networks, or wide area networks, such as the Internet or World Wide Web ("WWW") have provided new opportunities for marketing goods and services. Indeed, marketing on a wide area network can allow greater exposure of goods and services to consumers than traditional marketing techniques, and can provide such exposure for minimal costs.

To locate specific goods and services, a user must locate the specific computer address, or specific uniform resource locator ("URL"), wherein the goods and services are advertised. Thus, marketing directly to a URL is effective only if users frequent the locator. To increase the number of users exposed to information regarding a product or service, information providers, such as companies, utilize a multitude of direct marketing techniques. One popular direct marketing technique is to directly solicit users via the user's electronic mail. In this regard, an information provider can track the number of users that receive the advertisement. Further, an information provider can offer its products and services to a broader consumer base as it is relatively costless to conduct this type of a marketing campaign.

Because electronic mail marketing has proven to be an invaluable manner of successfully marketing products and services, the number of advertisements each individual user receives has increased so dramatically that users often receive more advertisements than personal messages in their electronic mail each day. As this problem has increased in severity, laws have been enacted to strictly govern the manner in which unsolicited electronic mail can lawfully be transmitted to a user. Indeed, current law requires that permission for such transmissions be received from the user prior to the transmission of the unsolicited electronic mail.

Current solutions to the issue of requiring permission to transmit unsolicited electronic mail involve confirmation with the user that the request is valid. These solutions are commonly known as double opt-in. Although these solutions are useful, they do not prevent fraudulent requests, especially a fraudulent initial conformation of a request, wherein the original fraudulent request is simply confirmed by the same user who made the original fraudulent request.

Further, although information providers can easily transmit all of their advertising to every user on these networks, this type of undifferentiated marketing does not necessarily increase sales or the reputation or goodwill of the marketed company. Indeed, if consumers receive excessive advertisements for products or services, consumers will begin to ignore all advertisements, even advertisements that might be of interest to the consumer. Further, some products or services marketed via a mass marketing campaign may not be available in the user's location, and thus, the advertisement is unnecessary and a waste of the user's time.

To avoid unnecessary advertising to a user, information providers have attempted to direct or redirect users to appropriate data, or materials, based, in part, upon the user information transmitted with the user's request. In particular, concurrent with each request for data transmitted from a user computer to the provider computer, the user computer transmits an IP address which identifies information about the user computer.

Each IP address, or block of IP numbers, are assigned to a particular internet service provider ("ISP"). Similar to a telephone number, portions of this number can identify some information about a user based solely upon the identity of the ISP which received the number. For example, a telephone number having an area code of 212 identifies New York, wherein the same telephone number having a 213 area code identifies California, and more specifically, parts of Los Angeles. The IP address comprises multiple sets of numbers, wherein each set of numbers corresponds to particular information regarding the user computer. Indeed, regarding the IP address, the IP address can identify the country IP codes or country ISO codes by virtue of the location of the ISP that received the IP address. The country ISO code identifies the geographic region or area from which the user's transmission originated, thereby identifying the physical geographic region of the user. Identification of the country where the user resides is important information as it allows the information provider the opportunity to select information that may be more relevant to that particular user, or in some instances, legally available to the user in that identified region.

Currently, resources are available on the Internet for searching IP addresses. To obtain the user IP country information, the information provider must 'look up' the IP address. In the current system, databases exist that contain lists of IP addresses and corresponding information for each IP address, including, but not limited to, information directed to the geographic regions associated with the IP address, WhoIs IP information, the ISP assigned to that number, including the company name of the ISP and the electronic mail address for the ISP, the corresponding physical location of the IP address (city and country) and the domain name associated with the IP address. The current such databases include, but are not limited to, the following: arin.net directed to North America, South America, sub-Saharan Africa and the Caribbean; ripe.net directed to Europe; apnic.net directed to Asian Pacific; register.br directed to Brazil; and nic.mx directed to Mexico.

An information provider attempting to identify a country ISO code identified by an IP address must search each of these databases until the IP address is found and the code is identified. For each database search, the information provider must log into a resource web site containing the database and enter the IP address. A search engine coupled to the resource web site searches the database for the IP address and desired information. Typically, the database includes information other than the geographic information, and thus, the database is large. The size of the database increases the amount of time required to ascertain the desired information. Due to the separate and distinct locations of the information, an information provider may be required to search all of the databases to ascertain the desired information. In light of the time required to search each database, and the potential requirement to search all of the databases, the current system is slow and inefficient.

A need in the industry exists to increase the dependability of the verification of valid data requests and thereby decrease fraudulent data requests. A further need exists to increase the efficiency of ascertaining desired data from an IP address. A still further need exists to more appropriately market goods and services to users based upon the user's location.

BRIEF DESCRIPTIONS OF THE DRAWINGS

The detailed description of embodiments of the invention will be made with reference to the accompanying drawings, wherein like numerals designate corresponding parts in the figures.

SUMMARY OF THE DISCLOSURE

The data transmission management system is directed to a system which is configured to confirm transmission requests from users and identify the user's geophysical region to allow the system to direct the user to data suitable for the identified region. Embodiments of the data transmission management system comprise a storage member, a confirmation system and a re-direct system. The storage member stores pertinent user information and correlates user information identified from the user's IP address with the input user data. The confirmation system comprises a data receiver, an anti-fraud member and a program commander, wherein the data receiver, anti-fraud member and program commander are in communication with each other.

The data receiver receives input data from users and routes it to appropriate locations. The data receiver comprises a plurality of input members and a controller, wherein the input members are integrated into a user interface. The user information is entered via the input members and is submitted to the confirmation system via a 'Submit' or 'Enter' button. In conjunction with submitting user input data, the user simultaneously submits a request for data.

The submitted information is transmitted to the controller, which is a processor. The submitted information includes the user's IP address which is automatically captured. The controller stores user information in the storage member and further, transmits at least some of the user information and the user request to the anti-fraud member.

The anti-fraud member is a software program that receives the transmitted request and, upon receipt of the request, transmits at least one notification message to the user requesting the user to confirm the original request for data and generates and transmits an electronic mail message to the user. In preferred embodiments, the anti-fraud member monitors the status of the user's response to the system's request for confirmation. If the user fails to respond, the anti-fraud member transmits additional notifications to the user requesting confirmation of the original request for information. The anti-fraud member continues to monitor the status of the request until the user responds or until a predefined condition has occurred. If the user confirms the original request, a confirmation notice is transmitted to the re-direct system. If the user fails to confirm the request for the original data, the request is not honored.

The program commander is coupled to the anti-fraud member and is configured to identify the user's electronic mail provider. If the mail provider can be identified, the program commander directs the user to the login page of the mail program. If the mail program cannot be identified, in some preferred embodiments, the program commander transmits a notice to the user to access his electronic mail account.

If the user confirms the request, the re-direct system identifies the geographic region from which the request originated and selects appropriate data for the geographic region. The re-direct system comprises an IP converter, a search engine and a controller. The IP address is stored into the storage member in association with the user's identifying information and is used to convert the IP address to an IP identifier. The IP identifier is transmitted to the search engine.

The search engine is a server which is configured to receive the IP identifier and to search a variety of sources to identify a country which corresponds to the IP identifier. Once the search engine identifies the country associated with the IP identifier, the name of the country is transmitted to the controller.

The controller is a computer program that determines whether the user's original request for data is acceptable in the identified geographic region or suitable for that region. If the data requested is not acceptable, the controller identifies and selects appropriate data or information for the identified country. If multiple data is available for a country or region, the controller selects the information to transmit to the user. Once the data is selected, the selected data is transmitted to the user.

If the user has requested data which requires a payment, the user is transmitted to a dynamic assistance module, wherein the dynamic assistance module assists the user in completing the inputting of on-line information to allow payment of the requested information. The dynamic assistance module comprises a dynamically generated form and at least one input member, wherein the dynamic form corresponds to an actual form possessed by the user, such as a check. In preferred embodiments, the input member corresponds to information on the actual form and is identified on the dynamic form such that the user can identify the requested information on the physical form or document.

A feature of preferred embodiments of the invention is that it improves the manner of ascertaining the geophysical location of an on-line user. An advantage to this feature is that it allows a provider to direct more appropriate or available goods and services to the user despite the initial offer to the user.

A further feature of preferred embodiments is a dynamic assistance module which includes a visual image of an on-line document requiring information and highlights incorrectly entered data. An advantage to this feature is that users can be visually guided to required information pertaining to documents in their possession. Another advantage to this feature is that a user can be easily assisted in correcting the input information.

A still further feature of preferred embodiments of the invention is that solicitations are presented to the user during the user's participation in related activities and allows for easy acceptance of the offer. An advantage to this feature is that the product or service exposure is increased. A further advantage is that a provider of goods or services can simultaneously upsell a user and increase sales. A still further advantage is that the infrastructure for a business can be eliminated and thus decrease costs.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

DETAILED DESCRIPTION OF PREFERRED EMBODIMENTS

Preferred embodiments of the instant invention operate on a network, such as, for example, the Internet or World Wide Web ("WWW"), or any other type of network system, including, an internet or an intranet.

Figure 1:
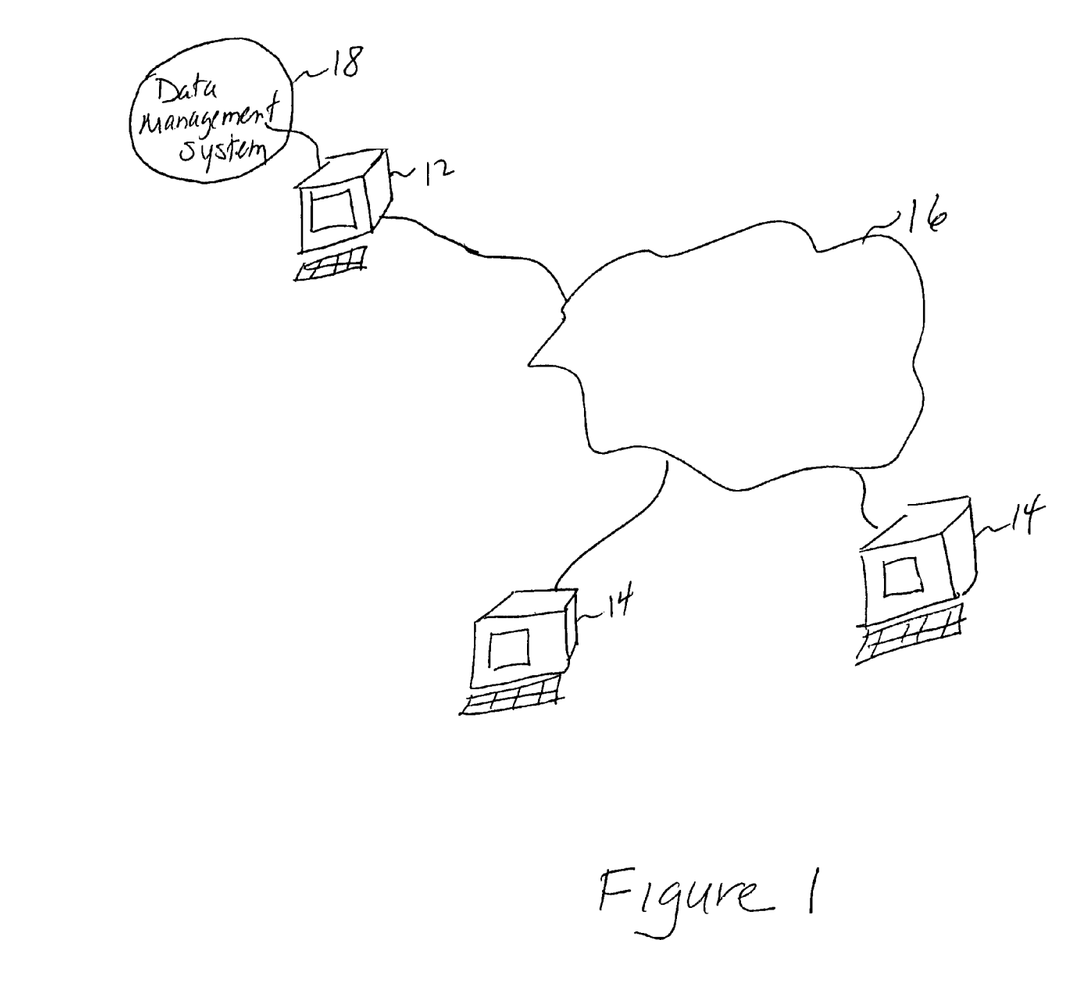
FIG. 1 is a network system environment in accordance with a preferred embodiment of the present invention.

Hardware Environment:

Preferred embodiments of the instant invention operate in accordance with a plurality of networked computers, such as, for example, a user or subscriber computer and a provider computer which are coupled together on a communications network, such as, for example, the Internet or a wide area network. FIG. 1 depicts a network system 10 that operates in accordance with preferred embodiments of the invention. In preferred embodiments, the network system 10 includes a server computer 12, or a provider computer, and a user computer 14, wherein the provider computer 12 and the user computer 14 are in electronic communication with each other via a communication link 16.

In some preferred embodiments, the network system 10 includes a plurality of either the provider computer 12, the user computer 14 or any combination thereof. The provider computer 12, or server, may comprise any suitable network device capable of providing content (data representing text, hypertext, photographs, graphics video and/or audio) for communication over the network. In preferred embodiments, the provider computer 12 comprises a programmable processor capable of operating in accordance with programs stored on one or more computer readable media (for example, but not limited to, floppy disks, hard disks, random access memory RAM, CD-ROM), to provide content for communication to a user computer 14. The provider computer 12 may comprise, for example, but not limited to, a personal computer, a mainframe computer, network computer, portable computer, personal digital assistant (such as, a 3Com Palm Pilot), or the like. The provider computer 12 may include one or more internal data storage devices (not shown) for storing content for communication to a user computer 14. Alternatively, or in addition, the provider computer 12 may be coupled to an external data storage device, computer or other means (not shown) from which the provider computer 12 may obtain content for communication to the subscriber computer 14. In one embodiment, the external device may comprise a further network device coupled in the network 10. The provider computer 12 is controlled by suitable software to provide the requested content to the requesting user computer 14, provided that various criteria are met.

In a preferred wide area network environment, such as the Internet environment, the provider computer 12 is controlled by suitable software to respond to a valid request for content by providing (or downloading) data to the user computer 14 from which the request was made. It will be understood by those skilled in the art that this process involves communications through suitable servers, routers and other components, as is dictated by the particular network environment.

The provider computer 12 operates with a persistent storage means (not shown), for example, one or more of the fixed and/or removable data storage devices and/or data communications devices connected to the computer. The communication link 16 may include a public network, such as the Internet, a local area network, or any other suitable communications connection, hardwired, wireless, or a hybrid thereof.

The user computer 14 may comprise any suitable network device capable of communicating with other network devices in the network system. In preferred embodiments, each user computer comprises a programmable processor capable of operating in accordance with programs stored on one or more computer readable media (for example, but not limited to floppy disc, hard disc, computer network, random access memory (RAM), CD Rom, or the like), a display device for providing a user-perceivable display (for example, but not limited to visual displays, such as cathode ray tube CRT displays, light-emitting-diode LED or liquid-crystal-diode LCD displays, plasma displays or the like, audio displays or tactile displays), and a user input device (for example, but not limited to, a keyboard, mouse, microphone, or the like). In one preferred embodiment, at least one subscriber computer comprises a personal computer system having a CRT display, a keyboard and a mouse user-input device.

The user computer 14 is controlled by suitable software, including network communication and browser software to allow a user to request, receive and display information (or content) from or through a provider computer 12 on the network system 10. The user computer 14 operates in accordance with programs stored on a readable medium, including, but not limited to, floppy disks, hard disks, RAM and CD-ROM. The user computer 14 is any means capable of communicating with the provider computer 12, including, but not limited, to personal computers, kiosks and ATM-type machines. The user computer 14 accesses the provider computer 12 via the wide area network or through some other remote access, such as, for example, by telephone, facsimile, personal digital assistant, pulse code system, web TV, or any other device or method that communicates alpha numeric data with a server.

General Description of Preferred Embodiments

Embodiments of the present invention are directed to a data transmission management system and method. In particular, a data transmission management system that is configured to confirm a user's request for the transmission of data and identify the user's geographical region to allow the system to direct data suitable for the identified region to the user.

Figure 2:
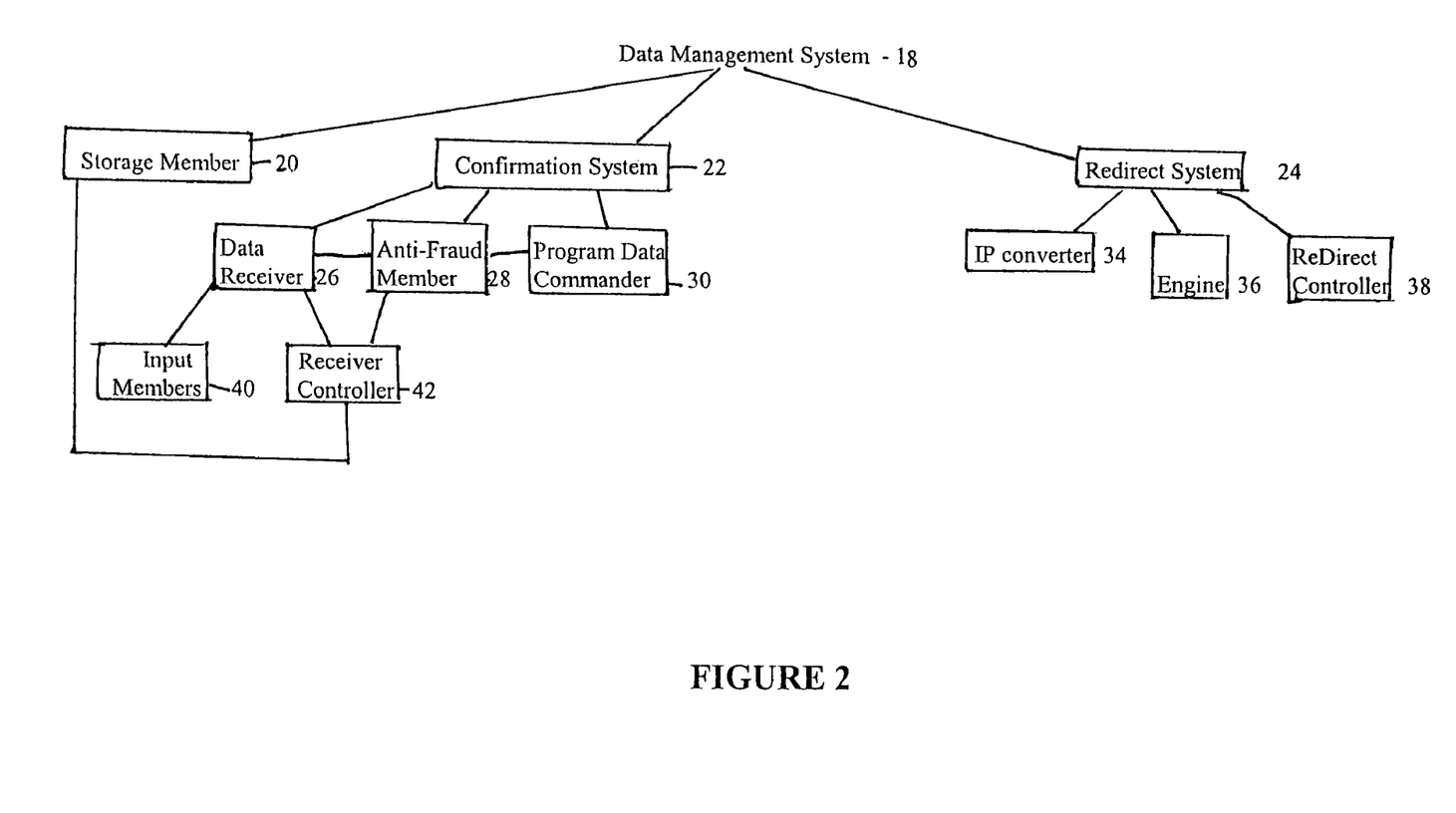
FIG. 2 is a diagram of a data management system in accordance with a preferred embodiment of the invention.

The data management system 18 resides on the provider service or is coupled thereto. With reference to FIG. 2, embodiments of the data transmission management system 18 comprise a storage member 20, a confirmation system 22 and a re-direct system 24. The confirmation system 22 comprises a data receiver 26, an anti-fraud member 28 and a program commander 30, wherein the data receiver 26, anti-fraud member 28 and program commander 30 are in communication with each other.

The storage member 20 is any suitable storage device, including an internal storage memory or external storage memory. The storage device is coupled to the provider computer and is accessible by the re-direct system 24.

Figure 3:
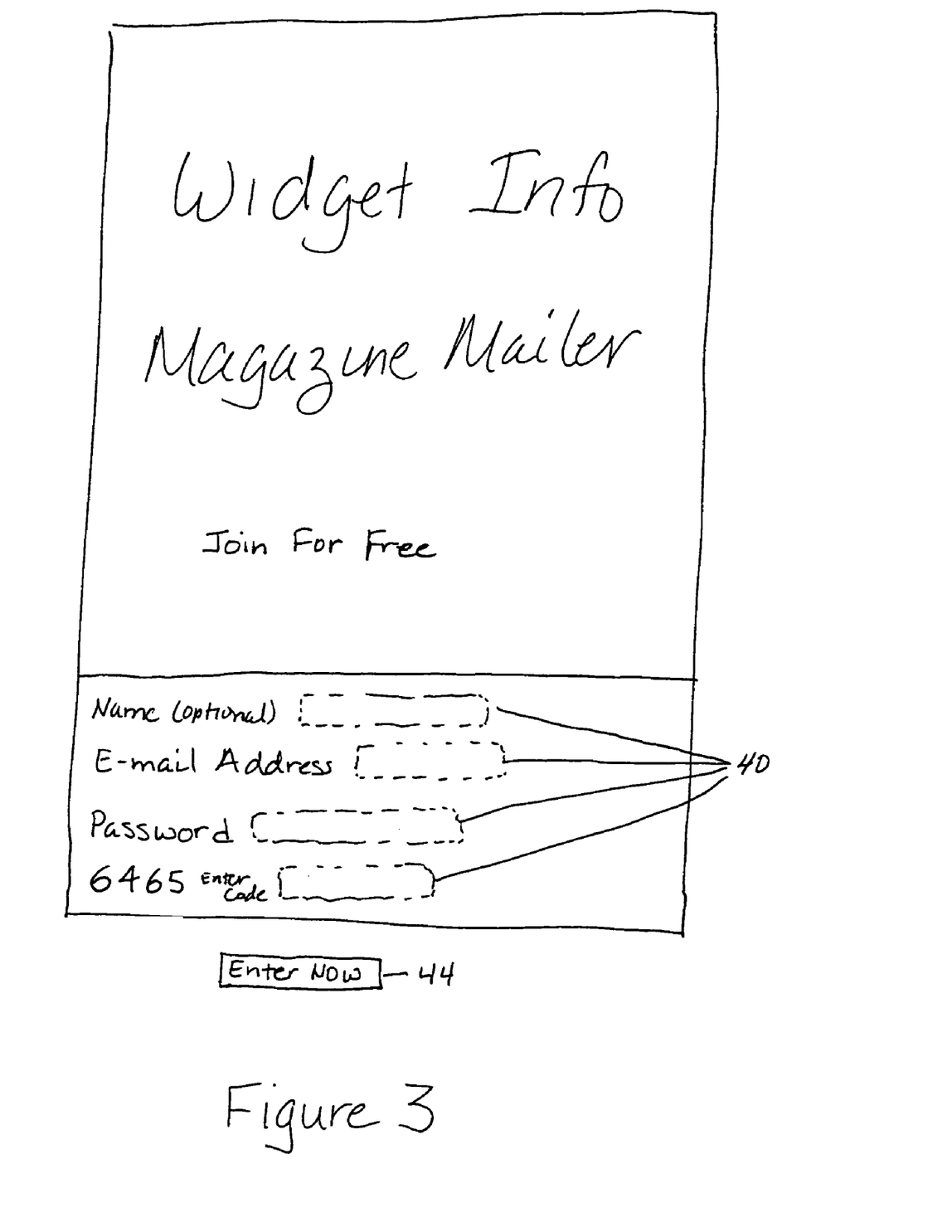
FIG. 3 is a user interface in accordance with a preferred embodiment of the invention.

The data receiver 26 is any suitable means for receiving data, or information, from users and routing it to appropriate locations. In preferred embodiments, the data receiver 26 comprises a plurality of input members 40 and a receiver controller 42. With reference to FIG. 3, the input members 40 are integrated into a user interface, such as a Web page, whereby the user can input predefined information to the confirmation system. The interface is configured to receive identifying information from users, including, but not limited to, an electronic mail address, a password and an anti-fraud code. In some preferred embodiments, the user can optionally input the user name corresponding to the electronic mail account.

The information is entered via the input members 40, such as, input boxes or via response to questions presented to the user by the confirmation system. Once the user is satisfied that the input information is accurate, the user submits the information and concurrently submits a first request for data to the confirmation system via a 'Submit' or 'Enter' button 44. In some preferred embodiments, the interface is an advertisement or other type of web page offering products or services, wherein the input boxes 40 are integrated into the advertisement and the first request for data is a request for the product or service being advertised.

With reference again to FIG. 2, the submitted information is transmitted to the receiver controller 42. The receiver controller 42 is a processor or other suitable hardware configured to process the input data. The submitted information includes a user computer identifier. In some preferred embodiments, the user computer identifier is the user computer's IP address which is automatically captured upon interaction between the user computer and the provider computer and is included with the transmitted information via well known transfer protocols, such as, TCP/IP. The receiver controller 42 stores user information in the storage member 20 and further, transmits at least some of the user information and the user request to the anti-fraud member 28. In some preferred embodiments, information that is stored in the storage member 20 includes the user computer identifier, such as, the user's IP address, and the user's electronic mail address.

Figure 4:
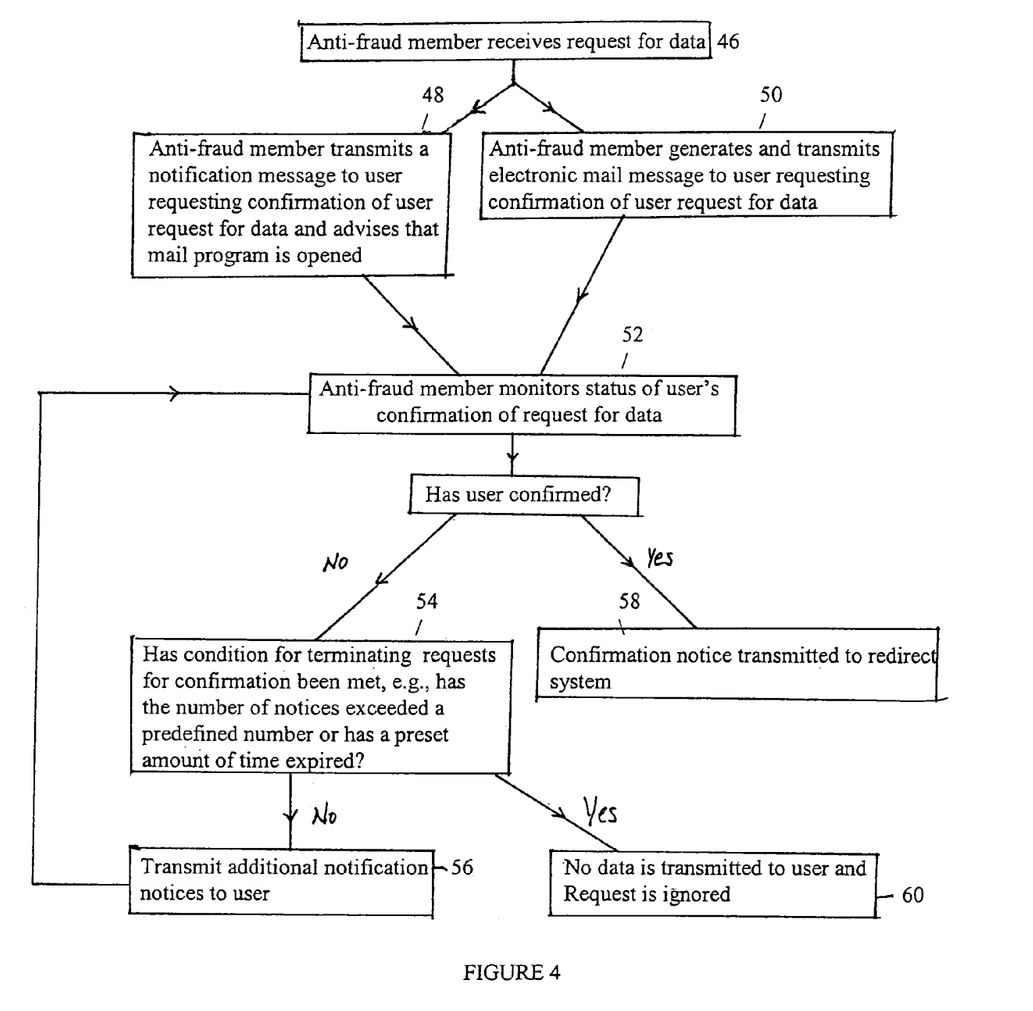
FIG. 4 is a process to confirm a user's request in accordance with preferred embodiments of the invention.

The anti-fraud member 28 is a software program that responds to, and monitors the request for data from the user. With reference to FIG. 4, the anti-fraud member receives the transmitted request 46 and, upon receipt of the request, transmits at least one notification message or web page to the user requesting the user to confirm the original request for data and advises the user that the electronic mail program associated with his electronic communication account, that is, his electronic mail account, has been opened 48 (discussed below). Additionally, the anti-fraud member generates and transmits an electronic mail message to the user 50. In preferred embodiments, the notification message directs the user to the electronic mail account, wherein the mail message from the system has been forwarded. In preferred embodiments, the anti-fraud member monitors the status of the user's response to the system's request for confirmation 52. If the user fails to respond, the anti-fraud member ascertains whether a predefined condition has been met, such as, a number of notifications are transmitted to the user without response or a preset time period has elapsed 54. If the condition has not been met, the anti-fraud member transmits additional notifications to the user requesting confirmation of the original request for information 56. The anti-fraud member continues to monitor the status of the request until the user responds or until the predefined condition has occurred. In some preferred embodiments, the anti-fraud member monitors the status until such time as the request is deemed stale or it removes the request for information to free storage for new requests. If the user confirms the original request, a confirmation notice is transmitted to the re-direct system 58. If the user fails to confirm the request for the original data, no data is transmitted to the user 60.

In addition to the activities of the anti-fraud member, upon transmission of the request for data, the program commander 30 retrieves the user's electronic mail address from the storage member 20 and identifies the electronic mail provider by comparing the electronic mail address to known domain names of electronic mail providers. If the mail provider is not identifiable from the electronic mail address, in some preferred embodiments, the program commander 30 transmits a notice to the user to check the user's electronic mail box for a message. In other preferred embodiments, as the anti-fraud member transmits a notification message to the user, the program commander takes no further action. If the mail provider is identifiable, as discussed above, the program commander accesses the web based mail login page for the user's identified mail provider and places the open window or frame of the mail program behind the notification message window. In preferred embodiments, the login page for the mail program is displayed. If the user has input the user name associated with the electronic mail address, the program commander inputs the user name into the login page of the mail program such that the user need only input his electronic mail password. As indicated above, the user is notified of the opened login page of the mail program which is opened in a window frame behind the notification message.

As discussed above, once the user confirms the original request, the anti-fraud member transmits a confirmation notice to the re-direct system 24. With reference again to FIG. 2, upon receipt of the confirmation notice from the anti-fraud member, the re-direct system 24 identifies the geographic region from which the request originated and selects appropriate data for the geographic region. For example, if a user is in Madrid, Spain, the data transmitted to the user could be in Spanish or for a product shipped to Spain.

The re-direct system 24 comprises an IP converter 34, a look-up engine 36 and a re-direct controller 38. The IP converter 34 selects predefined components or portions of the IP address, and as explained more fully below, utilizes the selected components of the IP address to generate an IP identifier. The IP identifier is a number which corresponds to the IP address, but is not the IP address. The IP identifier is a number that falls within a range of numbers, wherein each range of numbers is identified with a particular country. The IP identifier is used in the look-up engine 36.

The look-up engine 36 is software, which resides in RAM and in an external database on the provider computer, or is coupled thereto. The look-up engine 36 is configured to receive the IP identifier and to search a variety of sources to ascertain a match. The sources searched include the storage member 20, external databases and the internal RAM of the provider computer 12 for the range of numbers within which the IP identifier is found. When the range is found, the search engine 36 identifies the country associated with the range, and thus, identifies the country of origin for the original IP address. The name of the country corresponding to the IP identifier is transmitted to the re-direct controller 38. It is to be understood that these are not the only sources utilized to identify the IP identifier, but are local to the system and thereby increase the efficiency of the system if the information can be ascertained. locally. Further, each of these sources is populated and updated through use. Thus, the longer the system is in use, the more likely the local sources contain the desired information.

The re-direct controller 38 is a computer program that determines the geophysical origin of the original request and whether the originally requested information is appropriate for the geographic region of the user. If the requested information is not suitable for the identified region, the re-direct controller 38 identifies and selects appropriate data or information for the identified region. In some preferred embodiments, an advertiser for the originally offered goods or services provides 'default' information to send to the user. If multiple data is available for a country or region, the re-direct controller 38 selects the information to transmit to the user. The selection of the information to transmit to the user is determined, in part, by predetermined information provided by the advertiser, including, preselected information which is stored in a local database. Once the data is selected, the data is transmitted to the user.

The above described confirmation system 22 and redirect system 24 operate in conjunction with each other and the network system illustrated in FIG. 1 to increase the reliability of the confirmation that a user has requested information and further, to direct appropriate data to the user. In operation, with reference to FIG. 5, in preferred embodiments, an information provider offers goods or services to users 62. For example, in one preferred embodiment, the information provider offers a free subscription to a magazine mailer via an advertisement. The user accesses the offer via the network 10 and decides to accept the offer. In preferred embodiments, and again with reference to FIG. 3, embedded within the advertisement or offer is the input members 40, or input boxes which indicate the desired user information. To accept the offer, the user must enter predefined information. In one preferred embodiment, the user must enter a valid electronic mail address, a password and an anti-fraud security image code. To allow acceptance of the offer, a link is included within the advertisement, and is activated via any suitable means, including, but not limited to, an 'enter' button. Referring again to FIG. 5, if a user initially decides to accept the offer, after entering the desired user information, the user clicks on the 'enter' button 66. The clicking of the 'enter' button transmits the user's first request to accept the offer. The acceptance of the offer is the user's first request for data, goods, services or other items set forth in the offer. It is to be understood that nothing herein is intended to limit what is requested.

Figure 5:
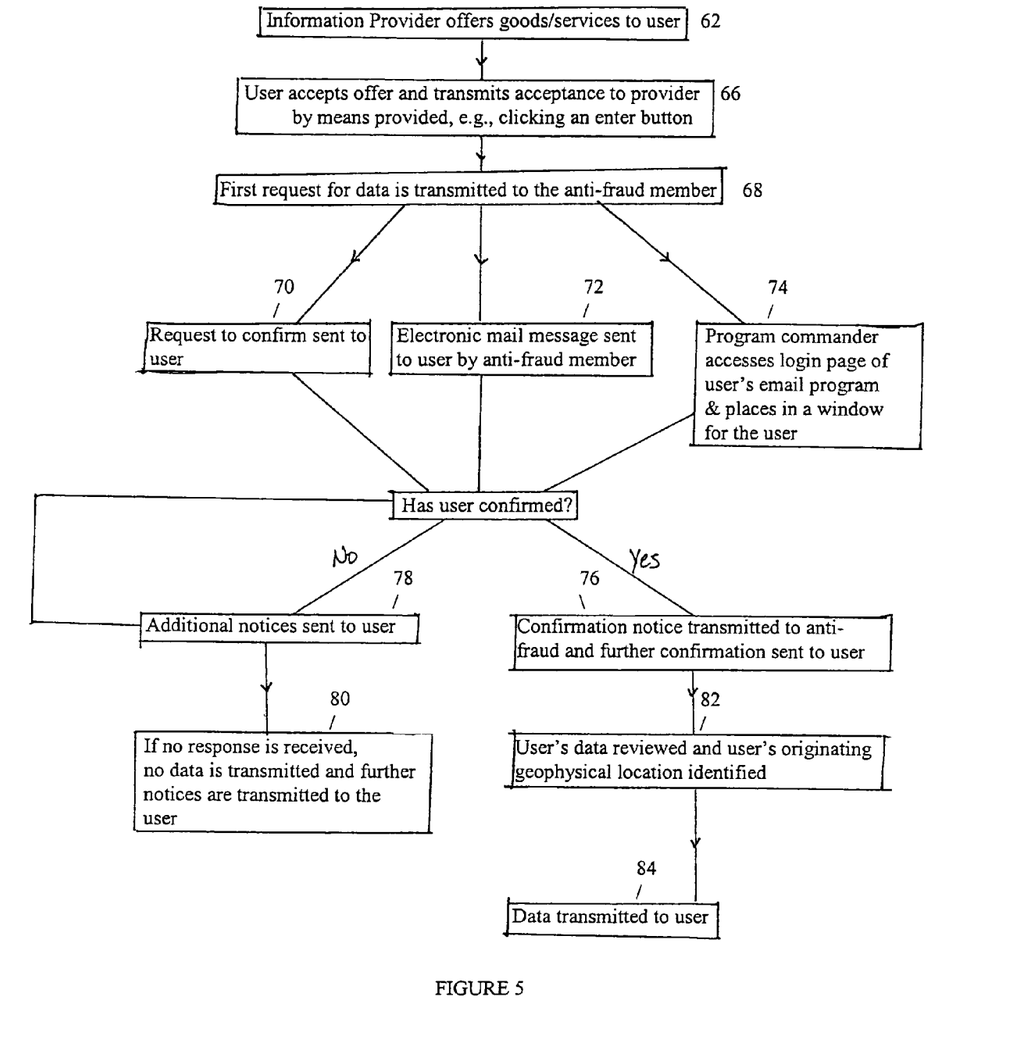
FIG. 5 is a block diagram of the data management process in accordance with the preferred embodiment of FIG. 1.

Upon the transmission of the request to accept the offer, that is, the clicking of the 'enter' button, the first request is transmitted to the anti-fraud member 68. Upon receipt of the first request to accept the offer, the anti-fraud member automatically generates and transmits an electronic mail message and a notification page to the user 70, 72, each instructing the user to confirm his request. In preferred embodiments, the notification page is a small pop-up window.

In addition, in some preferred embodiments, upon submission of the first request for information, the program commander retrieves the user's electronic mail address from the storage member, identifies the mail program, accesses the web based login page of the user's electronic mail program and opens the login page in a second window frame displayed behind the notification page 74. In some preferred embodiments, in addition to accessing the login page, the program commander inserts the user's name in the login page. Thus, to log in, the user is only required to insert his password. To alert the user, in addition to an instruction to confirm the request for data, the notification page transmitted by the anti-fraud member notifies the user that the login page has been opened. The second window frame containing the opened login page is displayed behind the notification page, wherein in preferred embodiments, the notification page is smaller in size than the open login page such that the user can see a portion of both windows.

In the instance wherein the user closes the notification page and the second window, that is, the electronic mail program page without responding to the confirmation request, a third window is displayed behind the second window, wherein the third window is a second notification page to the user to check his electronic mail. In this instance, the notification page may be transmitted prior to the closing of the first window, subsequent to its closing or in response to its closing. This third window can also contain other information, such as an advertisement for other services or goods as described below.

Figure 6:
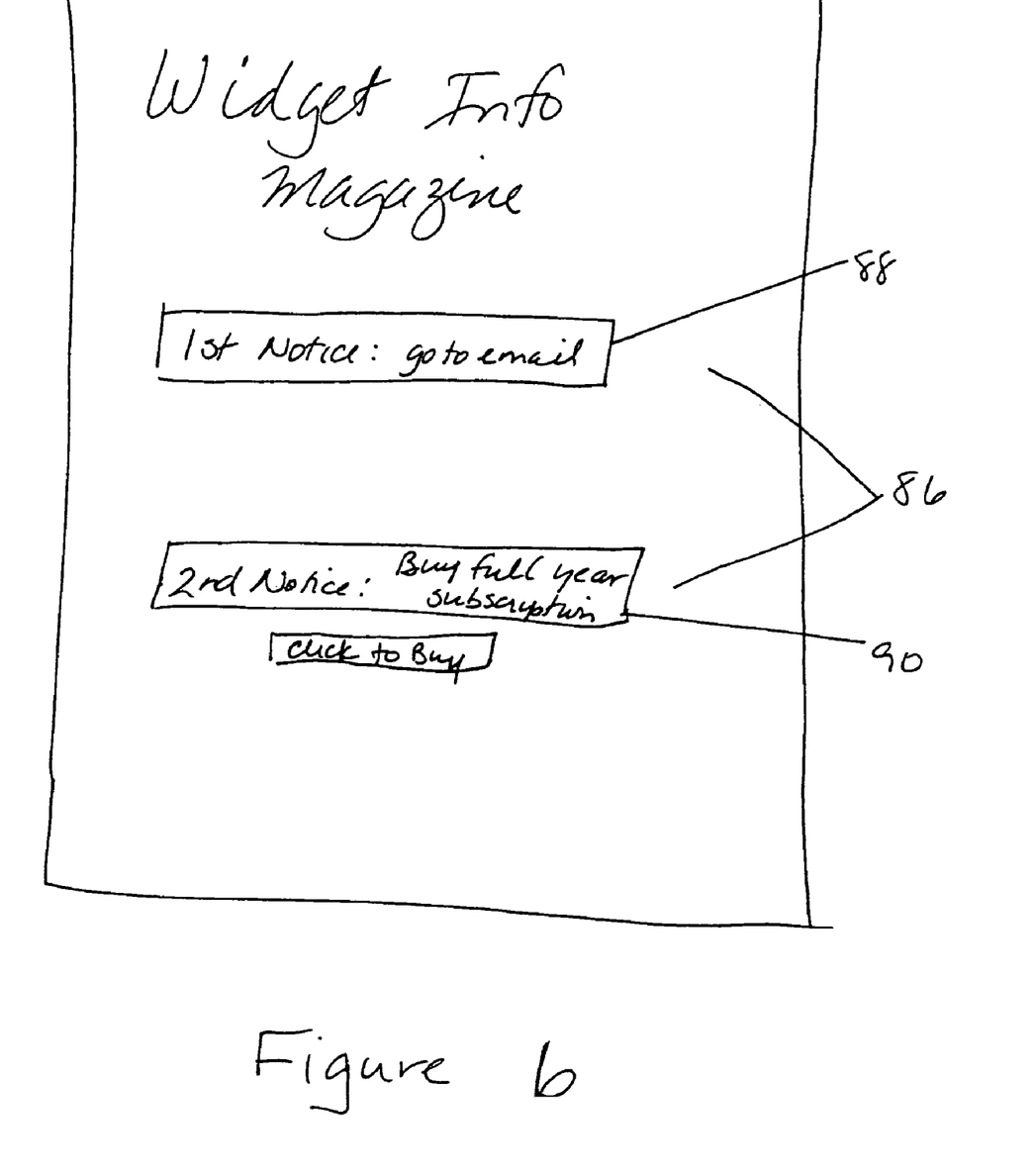
FIG. 6 is a notification page in accordance with a preferred embodiment of the invention.

With reference to FIG. 6, the second notification page (third window) comprises a plurality of notices 86, wherein in one preferred embodiment, the plurality of notices 86 comprises a first notice 88 and a second notice 90. The first notice instructs the user to go to his electronic mail. In some preferred embodiments, the first notice 88 identifies the subject of the electronic mail and the sender of the electronic mail so as to identify the electronic mail to be reviewed. In preferred embodiments, the second notice 90 can include any type of information, including, but not limited to, an advertisement for other services or goods. For example, the second notice is an attempt to 'upsell' the user, such as an advertisement for a 3-day trial subscription to a predetermined web site, or other service. It is to be understood that the number of additional notices can vary. For example, in some preferred embodiments, there is no second notice and in other preferred embodiments, more than two 'second' notices are presented to the user for a variety of subject matter. As discussed above, if the user ignores the first notice and exits the first notification page, the anti-fraud member transmits a second notification page to the user. The number of notification pages are tracked within the anti-fraud member. The second notification page can be presented to the user in any suitable manner, including, but not limited to, a pop-up window, wherein the second notification is an additional reminder for the user to check his electronic mail to confirm the first, that is, the original, user request.

Figure 7:
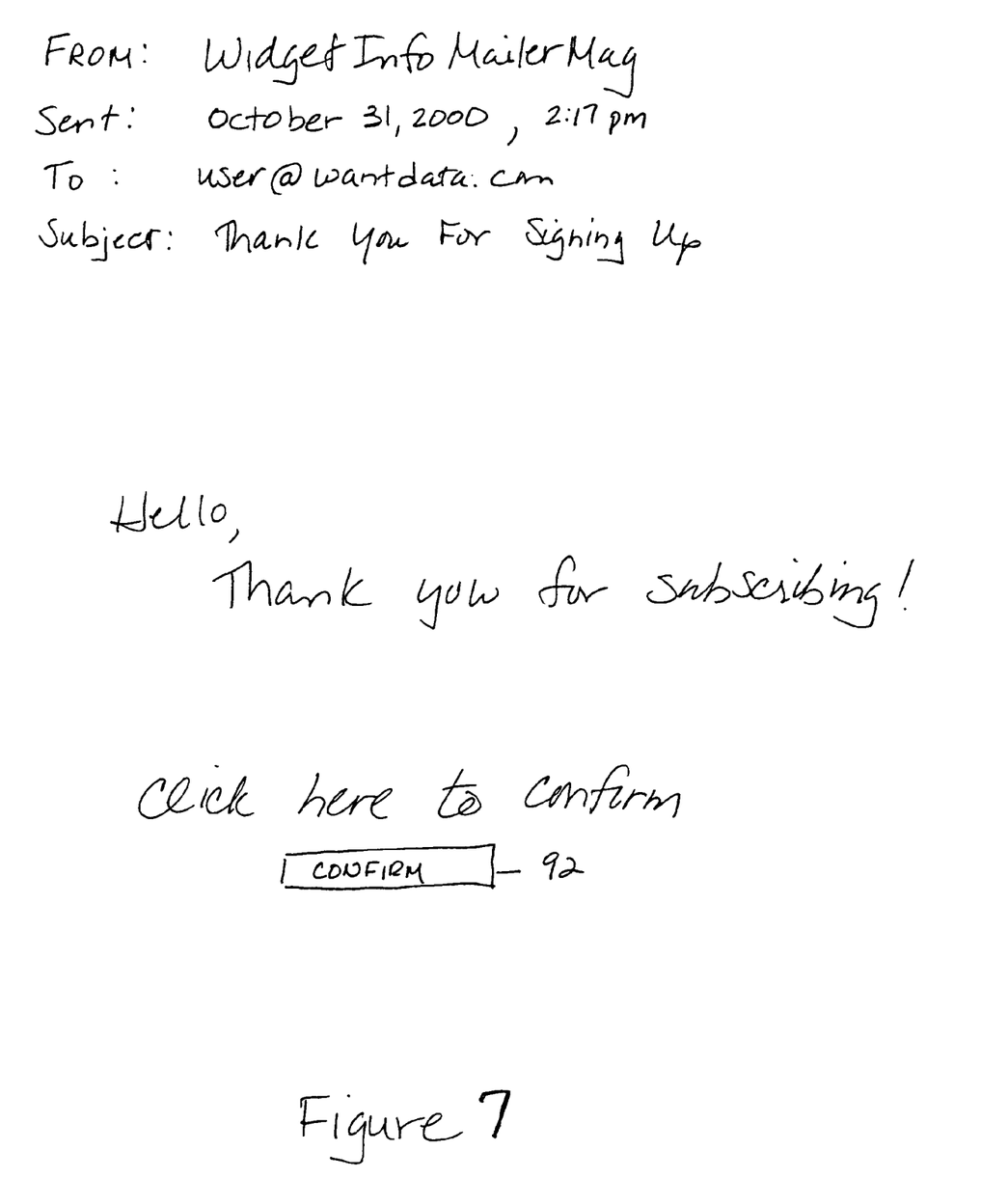
FIG. 7 is an electronic mail message transmitted by the anti-fraud member which includes a confirmation element in accordance with a preferred embodiment of the invention.
Figure 8:
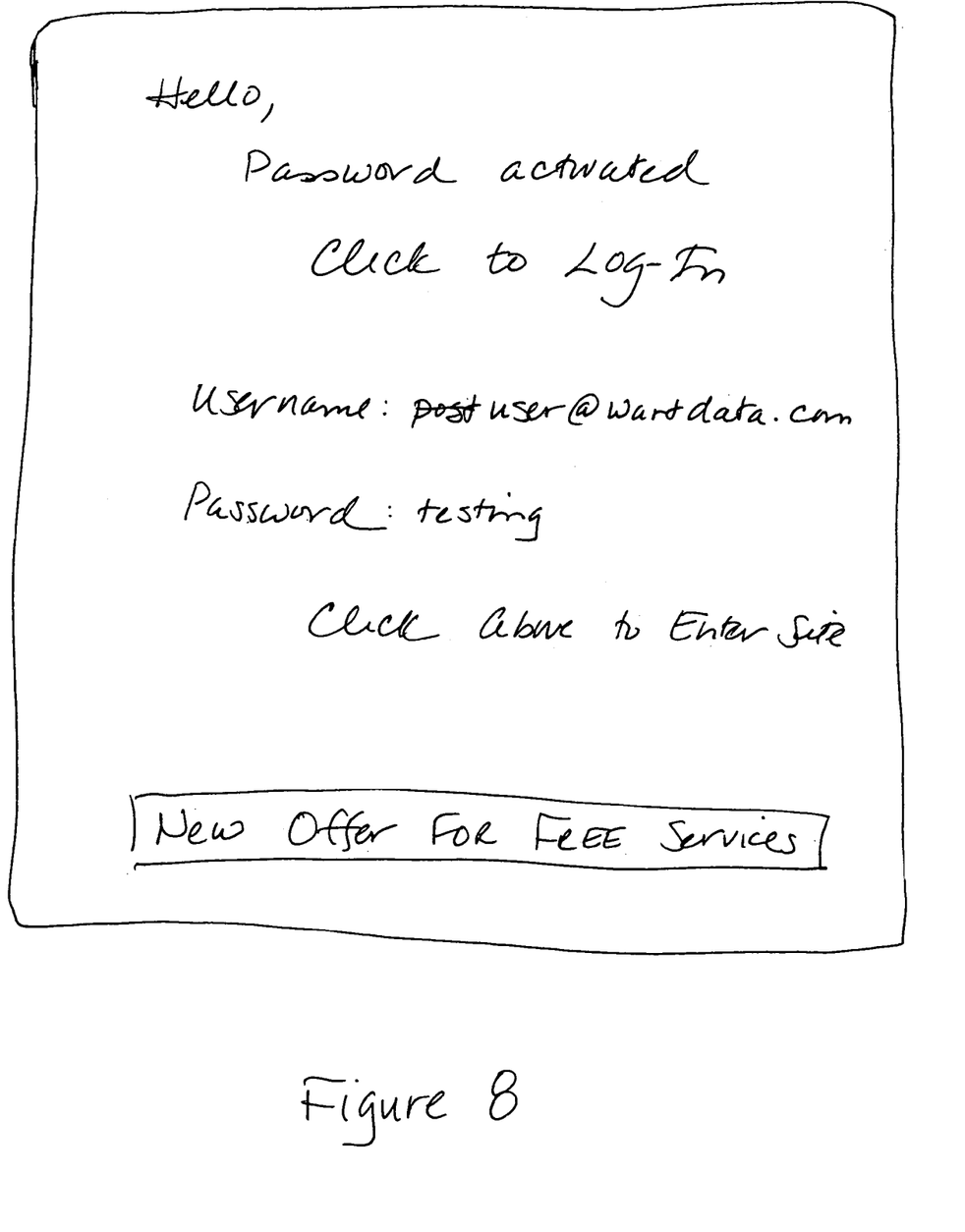
FIG. 8 is a confirmation window in accordance with a preferred embodiment of the invention.

To confirm the request for data, when the user accesses the electronic mail message, the user is required to perform some action. With reference to FIG. 7, in preferred embodiments, the electronic mail message includes an instruction to confirm the request and further includes a confirmation element 92, the confirmation element includes a description of a predetermined action that the user must perform to confirm the request for the service. In one preferred embodiment, the confirmation element is a link which, when the user clicks on the link, transmits an additional request to the anti-fraud member for the offer. It is to be understood that the confirmation element can describe any suitable action, including, but not limited to, calling a telephone number or entering and transmitting a specified code. Upon performance of the action described in the confirmation element, with reference again to FIG. 5, the confirmation is transmitted to the anti-fraud member, which in turn, transmits a notice of confirmation to the re-direct system and further transmits a confirmation window to the user 76. The confirmation window displays a user's name and password and provides a login link for the user to access the service (see FIG. 8). In addition to the confirmation window, in some preferred embodiments, the information provider transmits a second electronic mail message to the user containing additional offers, such as, an offer for upgraded services. For example, in one preferred embodiment, the user requests and receives a free subscription to an on-line magazine mailer and additionally, receives a free limited time subscription to a web site corresponding to the on-line mailer. If the user is not interested in receiving further notifications for the mailer, an 'opt-out' link or 'unsubscribe' link is contained within the message to the user.

If the user fails to respond to the notification pages, additional notices are transmitted to the user 78 (FIG. 5). Eventually, if no response is received from the user, no data is transmitted and no further notices are transmitted to the user 80. In some preferred embodiments, if a predefined condition is not met, for example, the number of notification pages transmitted to the user is equal to, or exceeds a predefined number of notices to send, the anti-fraud member records a non-confirmation of the first request and removes the first request from the system or otherwise deactivates the request such that no information is transmitted to the user.

Once the user has confirmed the request for the service and received a user name and password, in preferred embodiments, the information provider reviews the originally input user data, including the IP address, and ascertains the user's country code 82. Data is then transmitted depending upon geographic region information, such as, the input zip code and country information, the originally registered data may be transmitted to the user, or the IP re-direct controller 38 may direct alternate data to the user which is determined to be more appropriate for the user's geographic location 84.

Figure 9:
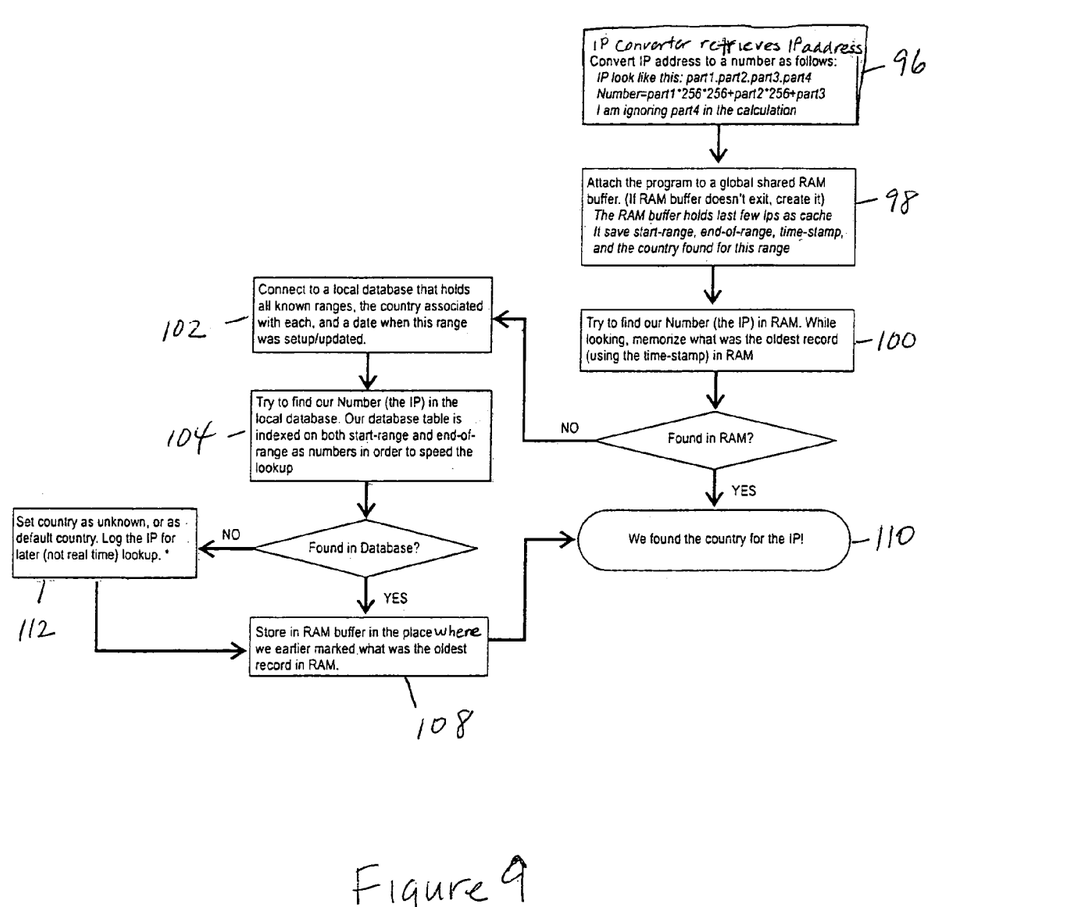
FIG. 9 is a block diagram of a process of identifying the geographic origin of an IP address in accordance with a preferred embodiment of the invention.

To identify the country of origin of the request, the redirect system references the user's IP address which has been collected and stored in the storage member. With reference to FIG. 9, to identify the country of origin, the user's IP address is converted to an IP identifier. As discussed above, the IP address comprises a plurality of components. In one preferred embodiment, the IP address comprises component1, component2, component3 and component4. To convert the IP address, the redirect system retrieves the IP address from the database and converts the IP address to an IP identifier 96 as follows:

$$(component1*256^2)+(component2*256)+(component3).$$

The IP identifier is then compared to IP identifier ranges stored in a global shared RAM buffer 98, wherein the global shared RAM buffer stores a predefined number of IP identifiers as cache. For each IP identifier stored, the shared RAM buffer stores the start-range, end-of-range, a time-stamp, and the country for each range. Thus, to identify the unknown IP identifier, a search is performed to determine the range in which the unknown IP identifier falls. In particular, the following comparison is made for each range: start-range $\leq$ unknown $\leq$ end. Sets of IP identifiers are stored from the start-range to the end-of-range, wherein each set receives a time stamp identifying the time and date of entry into the database. In this regard, the time stamp allows the replacement of new information, wherein the time stamp identifies the oldest set of information in the database which can be deleted and replaced with new information. It is to be understood that the oldest time stamped information is not necessarily replaced with the identical range of numbers, but is replaced with the next newest range of numbers related to the current users. If the IP identifier is found in RAM 100, the country of origin for that identifier is retrieved 110. The information transmitted to the user is then based upon the identified country if the originally requested data is inappropriate.

If the IP identifier is not located within RAM, the information provider connects to a local database that contains all known ranges, and the countries associated with each range 102. The database is searched by the search engine in an attempt to locate the IP identifier 104, wherein the database is indexed on the start-range and end of range to expedite identification of the IP identifier. In all instances, a time stamp is included in the database such that the information provider can determine whether the information is stale. Whether the information is considered stale is determined by predefined time period. If the IP identifier is located in the database, the IP identifier is stored in RAM replacing the oldest record in RAM 108, (for example, one set of start/stop range points) and then the country is identified 110. The country identification is transmitted to the re-direct controller 38 which selects and transmits information to the user. If the IP identifier is not located within the local database, it is stored for later "manual" batch look-up 112 as previously described and a default set of data or information is transmitted to the user.

Once the geographic region has been identified, the information provider provides access to the services or goods and in the above discussed example, the information, that is, the mailer, is transmitted to the user via electronic mail messages. In one preferred embodiment, the user receives access to a free subscription mailer and to an on-line magazine web site of the same name. To pay for the free services, advertisers in the mailer and in the on-line magazine can pay a fee to the information provider.

With the specific example above, the mailer includes a login link for the user, wherein the user name and password have already been entered. The user need only log into the on-line mailer by clicking on the link. In addition to the login link, the mailer message can include any other type of information the information provider desires to forward to the user, including, but not limited to additional advertisements for other goods and services. If the user links to the additional goods and services, the user is transmitted to a further advertising or join page for the advertised services. The linked advertisement includes a link back to the mailer if the user selects to disregard the advertisement's offer.

Once the user has logged into the mailer, the user is transmitted to the member's area of the on-line magazine and can access various products. In addition, the user is presented with an opportunity to upgrade the membership so as to allow more access to the web site associated with the magazine. If the user chooses to accept the offer, the user links to the sign-up page and signs up for the additional services as described above. Once the transaction has been approved, the information provider transmits an approval page to the user, wherein the approval page includes the user name and password.

The above described confirmation system can be used for any type of transaction, including transactions wherein the goods or services are shipped to the user and is not limited to goods and services offered and received on-line. For off-line delivery of goods and services, the system would allow for the elimination of infra-structure and costs typically required to operate a business.

The above described embodiments are directed to a user responding solely to the originally presented offer for data. However, as indicated above, throughout the process, the user is repeatedly presented with additional offers for upgraded services or even completely unrelated goods and services. Regardless of whether a user decides to accept the original offer, the user can accept any of the additional offers. For instance, and with reference again to FIG. 6, if the user chooses to respond to the second notice 90, that is, the upsell or offer for additional services or goods, the user clicks in the second notice and is transmitted to a user interface related to the additional services or goods, wherein the user must input user data. For example, the user must input a user name, password, name, address and country. The user data is input via input boxes or by any other suitable means, such as responding to presented questions. Once the user inputs the user data, the user submits the information via a 'submit' button.

In instances wherein a user must pay for the desired goods and services, in preferred embodiments, once a user transmits the request for the goods or services, the user is transmitted to a series of payment pages. In preferred embodiments, the initial payment page presents a plurality of payments options, including, but not limited to, payment by check and payment by credit card, wherein the user can select a payment options via a link. In preferred embodiments, the payment page defaults to the payment by check method and presents the user with input boxes for the checking account routing number and account number. If the user selects an alternative payment option, for example, to pay via credit card, the user clicks on the link and is transmitted to an alternative payment page. In one preferred embodiment, the alternative payment page displays an animated form representing a credit card and input boxes requesting information pertinent to a credit card transaction, namely, for the required information, such as, the credit card number and expiration date.

Upon receipt of the payment information, via check information or credit card information, the information provider accesses internal and external databases to confirm the input information. Some databases include, but are not limited to, banking databases, credit card databases, and other public databases that allow verification of the input information. If the information is not correct, notification is transmitted to the user and the correct information is highlighted. The user is then prompted to re-enter the information. If the user fails to enter the correct information after a predetermined number of attempts, the information provider will revoke the offer. If the information is entered correctly, the offered period of the services or goods commences. In some preferred embodiments, if a user is located outside of the United States, the only payment option available to the user is via a credit card.

Figure 10:
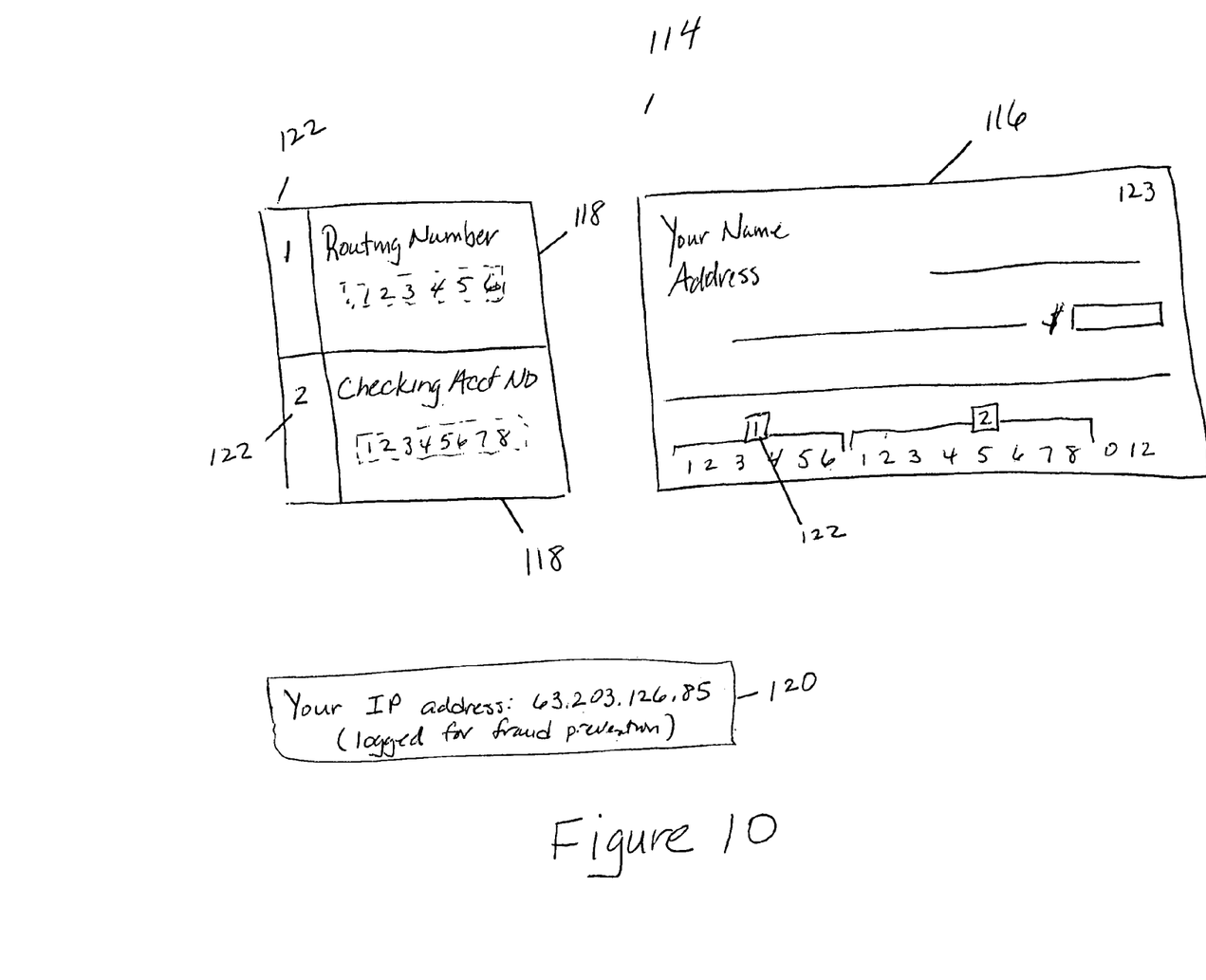
FIG. 10 is a representation of a dynamic form used in a dynamic assistance module in accordance with a preferred embodiment of the invention.

In preferred embodiments, to assist users in entering requested information for payment, the payment pages comprise a dynamic assistance module 114. With reference to FIG. 10, the dynamic assistance module 114 is a software program including graphic user interfaces 112, 116 which guide or assist the user in providing requested information. FIG. 10 depicts a representation of a dynamic assistance module in accordance with a preferred embodiment. The dynamic assistance module 114 is a tool that assists users in completing forms or otherwise identifying and providing information requested for any reason. The dynamic assistance module could assist users on a variety of situations, including, but not limited to, filling out forms, providing information on a questionnaire, providing information to perform a calculation, such as, determining the amount of a mortgage payment based on various percentage rates, or assessing a user's qualifications for a loan.

The dynamic assistance module comprises a dynamic assistance interface 116, at least one user input box 118, and an anti-fraud element 120. The dynamic assistance module 116 is a graphical representation presented to the user to assist the user in identifying the item from which the user must extract data. In preferred embodiments, the dynamic assistance interface corresponds to an item possessed by the user and directs the user to the location of the required information on the item possessed by the user. For example, the dynamic assistance interface can be, but is not limited to, a driver's license, a check, a credit card, a birth certificate, an invoice or any other document which contains information that the user needs to complete a form, questionnaire, application or otherwise respond to request for information.

The dynamic assistance interface identifies the requested information presented to the user via the input boxes 118. Referring to the payment process referenced above, for payment by check, in one preferred embodiment, the dynamic assistance interface 116 is a check image and the input boxes 118 request the checking account routing number and the account number. Each input box further comprises an identifier 122, wherein each identifier is displayed on the animated form 116. For example, the routing number is identified by identifier 1 and is displayed on the check image to indicate the location of the routing number. In this regard, a user can identify the routing information on the actual check and enter the correct number.

In addition to the input boxes 118 for the required information, the payment page displays an anti-fraud element 120. In preferred embodiments, the anti-fraud element 120 displays and records the user's IP address. In this regard, the identity of the user can be ascertained from the ISP provider, which can identify a user utilizing an IP address at a given time, and thus, minimize fraudulent actions or punish fraudulent behavior. Once the required information is entered, the information is transmitted to the information provider for verification. In some preferred embodiments, the dynamic assistance module does not include an anti-fraud element 120.

If the user enters incorrect information, the animated process module will display and highlight the location of the incorrect data and will prompt the user to re-enter the information. As discussed above, if the user fails to enter the correct information after a predetermined number of attempts, the offer is revoked. In same preferred embodiments, the anti-fraud element is flagged for potentially fraudulent activity.

It is to be understood that many of the features described herein are utilized through an offer-acceptance process with a user. However, none of the described features or use of the features is intended to be limiting. For example, as described above, the dynamic assistance module is not limited to animated payment forms, but rather, can be employed in a variety of situations, such as filing of documents on-line, or the filling out of any form on-line or off-line and is not intended to be limiting. Further, the IP identifier used to identify the physical origin of a user's transmission can be combined with the dynamic assistance module to assist in providing users with appropriate on-line forms. For example, a user in Los Angeles, Calif., may require a specific form for applying for land permits, wherein a different form may by required for Ventura County, California. In this instance, the geophysical location of a user logging into a general form center could be identified by the IP address as described above, and automatically provide the user with the appropriate form coupled with the dynamic assistance module to assist the user in preparing the forms.

Further, in preferred embodiments, the dynamic assistance module is intended to include any type of system that utilizes visual aids to assist a user with a project. For example, in some preferred embodiments, the dynamic assistance interface is configured to dynamically add information or perform some set of predefined instructions, such as calculate a mortgage payment based on the input number of years and the percentage rate. In other preferred embodiments, the dynamic assistance module modifies the input information required on a document or form based upon the input user data.

In still other preferred embodiments, the dynamic assistance interface can include a video or an animation. For example, a video program could illustrate the information desired from the user or graphically represent the user's input information. It is to be understood that the visual assistance could include any type of representation designed to instruct the user. For example, if a user is married and has three children, once the user inputs his marital status and number of children, an animated family including a wife, husband and three children could be presented to the user. The sexes of the children could also graphically be represented if identified in the input information. Further, if a social security number for a husband and wife need to be supplied, to request the husband's social security number, the graphical interface could present an image of the male figure moving to the front of the scene and pulling out a social security card wherein the social security number is enlarged and highlighted. Once the user enters the husband's social security number, the male figure moves back to its original position and the adult female figure is moved to the front of the scene and similarly presents her social security card, thereby indicating that the user needs to enter the wife's social security number. Upon entering the wife's social security number, the female figure would move back to its original position. The required answers for other questions could be similarly graphically represented. In this regard, embodiments of the invention could be used for illiterate persons or persons having poor reading skills. Further, the dynamic assistance module could assist learning impaired persons by presenting the impaired user with images representing the desired information.

Although the foregoing described the invention with preferred embodiments, this is not intended to limit the invention. Rather, the foregoing is intended to cover all modifications and alternative constructions falling within the spirit and scope of the disclosure and the embodiments, as described, and as expressed in the appended claims, wherein no portion of the disclosure is intended, expressly or implicitly, to be dedicated to the public domain if not set forth in the claims.

What is claimed is:

1. A data transmission management system on a computer network having a provider computer and a user computer, the user computer being identifiable by a computer identifier, wherein the provider computer and the user computer are in communication there between, the system comprising:
   a storage member;
   a confirmation system, wherein the confirmation system is configured to receive a request for data transmitted from the user computer and to confirm the request for data prior to the transmission of the data to the user computer, by communicating a confirmation request that is unrelated to the price associated with the requested data; and
   a redirect system, wherein the confirmation system and the redirect system are coupled to each other and the storage member, and wherein the redirect system identifies the geographic region of the user computer prior to the transmission of data;
   wherein the re-direct system is configured to identify an IP address associated with a user computer from which a request for data is received, and to convert the IP address to an IP identifier by the following conversion equation:

$$(component1*256^2)+(component2*256)+(component3),$$

where component1, component2 and component3 are each different component parts of the IP address and where the re-direct system identifies a geographic region based at least in part on the IP identifier.

2. A data transmission management system as claimed in claim 1, wherein the confirmation system further comprises:
   a data receiver, the data receiver comprising at least one receiving member and a controller, wherein the receiving member receives an input data from the user computer;
   an anti-fraud member; and
   a program commander, wherein the data receiver, anti-fraud member and program commander are in communication with each other, and wherein upon receipt of the request for data, the anti-fraud member transmits a notice to the user computer requesting confirmation of the request for data.

3. A data transmission management system as claimed in claim 2, wherein the data receiver is configured to receive an account identifier for an electronic communication account, the account identifier being associated with an electronic communication program.

4. A data transmission management system as claimed in claim 3, the anti-fraud member being configured to automatically generate and transmit an electronic communication to the electronic communication account, wherein the electronic communication is directed to the account identifier.

5. A data transmission management system as claimed in claim 2, the anti-fraud member being configured to generate and transmit an electronic communication to the electronic communication account, and to generate and transmit a notification message to the user computer, wherein the electronic communication is directed to the account identifier.

6. A data transmission management system as claimed in claim 1, wherein the re-direct system verifies whether the data requested by the user computer is suitable for the geographic region of the user computer.

7. A data transmission management system as claimed in claim 6, wherein the re-direct system transmits an alternative set of data if the data requested by the user computer is not suitable for the geographic region of the user computer.

8. A data transmission management system as claimed in claim 1, wherein the redirect system selects data for transmission to the user based upon the identified geographic region.

9. A data transmission management system as claimed in claim 1, wherein the confirmation system is configured to confirm the request for data by sending at least one communication to the user computer requesting that the user send a confirmation message, in response to the request for data.

10. A data transmission management system as claimed in claim 1, wherein, upon receipt of a request for data from the user computer, the confirmation system is configured to generate an electronic mail message and transmit the electronic mail message to an electronic mail account associated with a user of the user computer.

11. A data management system on a communication network for confirming a user's request for transmission of data before providing requested data to the user, the system comprising:
    a computer processor configured to respond to a data request received on the communication network by (a) communicating a request for confirmation to a user associated with the request, the request for confirmation being unrelated to a price associated with requested data, (b) determining if the user confirms or does not confirm the data request and (c) providing a notice to direct data to the user in the event of a determination that the user confirmed the data request, where such data is not directed to the user in the event of a determination that the user has not confirmed the data request; and the computer processor further configured for selecting data to provide to the user on the communication network in response to receipt of the notice from the anti-fraud unit to direct data to the user;

the computer processor further configured to provide:

an IP converter that generates an IP identifier from one or more selected portions of an IP address associated with the user from which the data request is received, the IP identifier being different than the IP address from which it was generated;

a look-up engine that matches the IP identifier with a particular geographic region; and a re-direct controller that determines whether the requested information is appropriate for that particular geographic region and, if not, to select appropriate data for that particular geographic region.

12. A system as recited in claim 11, wherein the data request is received from a computer connected for communication on the communication network, and wherein communicating the request for confirmation to a user associated with the request comprises providing information to a computer from which the request was received, for displaying a page or window that includes a message requesting the user to confirm the data request.

13. A system as recited in claim 11, wherein communicating the request for confirmation to a user associated with the request comprises sending an e-mail message to an e-mail address associated with the user.

14. A system as recited in claim 13, wherein the e-mail message describes a predefined action that the user is to perform for confirming the data request.

15. A system as recited in claim 13, wherein the e-mail message describes a predefined action that the user is to perform for confirming the data request, wherein the predefined action includes at least one of activating a link to information on the communication network, entering and transmitting a specified code on the communication network and calling a predefined telephone number.

16. A system as recited in claim 11, wherein the data request is received from a computer connected for communication on the communication network, and wherein communicating the request for confirmation to a user associated with the request comprises sending an e-mail message to an e-mail address associated with the user, and providing information to a computer from which the request was received for displaying a page or window that includes a message requesting the user to check for the e-mail.

17. A system as recited in claim 11, wherein the computer processor is further configured to identify a geographic region associated with the location of the user from which the data request is received, and to select data associated with the identified geographic region for transmission to the user.

18. A data management method on a communication network for confirming a user's request for transmission of data before providing requested data to the user, the method comprising:

receiving a data request from a user on the communication network;

responding to the data request received on the communication network by (a) communicating a request for confirmation to a user associated with the request, the request for confirmation being unrelated to a price associated with requested data, (b) determining if the user confirms or does not confirm the data request and (c) providing a notice to direct data to the user in the event of a determination that the user confirmed the data request, where such data is not directed to the user in the event of a determination that the user has not confirmed the data request;

selecting data to provide to the user on the communication network in response to the notice to direct data to the user;

generating, via a computer processor, an IP identifier from one or more selected portions of an IP address associated with the user from which the data request is received, the IP identifier being different than the IP address from which it was generated;

matching, via the computer processor, the IP identifier with a particular geographic region; and determining whether the requested information is appropriate for that particular geographic region and, if not, selecting appropriate data for that particular geographic region.

19. A method as recited in claim 18, wherein the data request is received from a computer connected for communication on the communication network, and wherein communicating the request for confirmation to a user associated with the request comprises providing information to a computer from which the request was received, for displaying a page or window that includes a message requesting the user to confirm the data request.

20. A method as recited in claim 18, wherein communicating the request for confirmation to a user associated with the request comprises sending an e-mail message to an e-mail address associated with the user.

21. A method as recited in claim 20, wherein the e-mail message describes a predefined action that the user is to perform for confirming the data request.

22. A method as recited in claim 20, wherein the e-mail message describes a predefined action that the user is to perform for confirming the data request, wherein the predefined action includes at least one of activating a link to information on the communication network, entering and transmitting a specified code on the communication network and calling a predefined telephone number.

23. A method as recited in claim 18, wherein the data request is received from a computer connected for communication on the communication network, and wherein communicating the request for confirmation to a user associated with the request comprises sending an e-mail message to an e-mail address associated with the user, and providing information to a computer from which the request was received for displaying a page or window that includes a message requesting the user to check for the e-mail.

24. A method as recited in claim 18, wherein determining if the user confirms or does not confirm the data request comprises monitoring information received from the communication network for a user's response to the request for confirmation, communicating one or more additional requests for confirmation and discontinuing monitoring upon completion of a predefined number of the one or more additional requests for confirmation or upon the lapse of a predefined time period, without receiving the user's response to the requests for confirmation.

25. A method as recited in claim 18, further comprising identifying a geographic region associated with the location of the user from which the data request is received, and to select data associated with the identified geographic region for transmission to the user.

* * * * *